(12) United States Patent
Neal et al.

(10) Patent No.: US 9,839,955 B2
(45) Date of Patent: Dec. 12, 2017

(54) AMORPHOUS METAL PERMANENT FASTENER UTILIZING A THERMOPLASTICALLY SWAGED RETAINER

(71) Applicant: NORTHROP GRUMMAN SYSTEMS CORPORATION, Falls Church, VA (US)

(72) Inventors: Matthew A. Neal, Palmdale, CA (US); Charles R. Smith, Acton, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 255 days.

(21) Appl. No.: 14/713,335

(22) Filed: May 15, 2015

(65) Prior Publication Data
US 2016/0333918 A1    Nov. 17, 2016

(51) Int. Cl.
*F16B 19/05* (2006.01)
*B21J 15/08* (2006.01)
*B21J 15/02* (2006.01)

(52) U.S. Cl.
CPC ............. *B21J 15/08* (2013.01); *B21J 15/022* (2013.01); *F16B 19/05* (2013.01)

(58) Field of Classification Search
CPC ....................................................... F16B 19/05
USPC .......................................................... 411/361
See application file for complete search history.

(56) References Cited

U.S. PATENT DOCUMENTS

| | | | | |
|---|---|---|---|---|
| 3,139,786 A | * | 7/1964 | Ardell | F16B 19/05 411/361 |
| 3,483,788 A | * | 12/1969 | Keeler | F16B 19/05 411/361 |
| 4,373,159 A | | 2/1983 | Leavitt et al. | |
| 4,687,395 A | * | 8/1987 | Berecz | B29C 65/601 244/132 |
| 4,983,085 A | * | 1/1991 | Gray | B25B 13/48 411/336 |
| 4,987,714 A | | 1/1991 | Lemke | |
| 5,320,465 A | | 6/1994 | Smith | |
| 5,354,160 A | * | 10/1994 | Pratt | B21J 15/00 29/243.521 |

(Continued)

FOREIGN PATENT DOCUMENTS

WO    2013/141878 A1    9/2013

*Primary Examiner* — Flemming Saether
(74) *Attorney, Agent, or Firm* — John A. Miller; Miller IP Group, PLC (57) ABSTRACT

A permanent faster is disclosed that utilizes an amorphous metal alloy for a retaining collar that is thermoplastically formed on install. The fastener includes a headed pin with locking grooves disposed thereon and a collar having a cylindrical inner wall. Head geometry may be any suitable shape; countersunk, counter bore, flat, etc., and may also be non-rotationally symmetric. The pin is disposed into aligned holes through the work pieces to be secured, and the collar is disposed about the pin over the locking grooves. The collar is heated into a thermoplastic region, something only allowed because of the amorphous metal material properties. The cylindrical wall of the collar is then radically compressed into the locking grooves to affix the collar on the pin. The amorphous metal properties allow use of a smaller fastener, and the thermoplastic region is reached at a temperature which does not damage composite work pieces.

17 Claims, 6 Drawing Sheets

(56) References Cited

U.S. PATENT DOCUMENTS

| | | | |
|---|---|---|---|
| 6,398,450 B1* | 6/2002 | Jarvis | F16B 1/0014 |
| | | | 29/447 |
| 7,824,434 B2 | 11/2010 | Von Oepen | |
| 7,896,599 B2 | 3/2011 | Stephen et al. | |
| 7,966,711 B2* | 6/2011 | Keener | B29C 65/562 |
| | | | 29/458 |
| 8,262,331 B2 | 9/2012 | Toosky | |
| 8,312,606 B2 | 11/2012 | Reid et al. | |
| 8,322,958 B2 | 12/2012 | Haylock et al. | |
| 8,475,102 B2 | 7/2013 | Haylock et al. | |
| 8,636,455 B2 | 1/2014 | Wehrmeister et al. | |
| 8,961,091 B2* | 2/2015 | Prest | B21J 1/006 |
| | | | 411/424 |
| 2012/0168055 A1 | 7/2012 | Bray et al. | |
| 2013/0022427 A1 | 1/2013 | Yamanaka et al. | |
| 2013/0302109 A1 | 11/2013 | Pinzl | |
| 2013/0330145 A1 | 12/2013 | Cloud | |
| 2013/0333165 A1 | 12/2013 | Prest et al. | |
| 2014/0219744 A1 | 8/2014 | Heeter et al. | |
| 2015/0107083 A1* | 4/2015 | Prest | B21J 1/06 |
| | | | 29/505 |
| 2015/0252833 A1 | 9/2015 | Brewer et al. | |

* cited by examiner

AMORPHOUS METAL PERMANENT FASTENER UTILIZING A THERMOPLASTICALLY SWAGED RETAINER

BACKGROUND

Field

This invention relates generally to a deformable permanent fastener and, more particularly, to a permanent fastener for joining two work pieces, where the fastener includes a headed pin passing through holes in the work pieces with locking grooves on a shank portion, and a retaining collar composed of an amorphous metal alloy, where the collar is heated into a thermoplastic region and radially compressed such that the collar deforms to engage with the locking grooves on the shank portion of the pin.

Discussion

Various industries, including aviation, general construction, electronics, and general manufacturing, use fasteners for a number of different purposes. For example, in the aviation industry, aircraft structures are often comprised of two or more panels—which may be made of the same material or different materials, and which must be permanently fastened together.

Many different types of fasteners for joining two work pieces have been developed over the years—including everything from old-fashioned pounded rivets, to fasteners made of modern materials. Traditional one-piece or two-piece fasteners requiring plastic deformation upon installation have been used in various applications. However, in the aircraft industry, these fasteners require multiple production steps to ensure proper grain boundary control in the metal, and multiple installation and post-processing steps such as machining and inspection. These procedural steps add time and cost to the usage of plastically deformed metal fasteners. In addition, these fasteners use materials with grain boundaries which are inherently susceptible to onset and propagation of corrosion, stress concentrations and fatigue.

Threaded fasteners do not involve plastic deformation upon installation, but typically employ materials with the same limitations and susceptibilities as described above for plastically deformed metal fasteners. In addition, threaded fasteners are prone to inconsistent clamp-up force, and are also vulnerable to creep or loosening due to vibrations and shock experienced during service life.

In a highly fatigue-sensitive environment such as an aircraft structure, a fastener is needed which offers reduced installation time and fewer installation steps than traditional plastically-formed fasteners, better fastener material properties, more fastener geometric options, improved fastener gripping strength, more consistent clamping force, and resistance to vibration and shock. These features can be achieved with the amorphous metal fastener designs disclosed herein.

DETAILED DESCRIPTION OF THE EMBODIMENTS

The following discussion of the embodiments of the invention directed to an amorphous metal permanent fastener utilizing a thermoplastically swaged retainer is merely exemplary in nature, and is in no way intended to limit the invention or its applications or uses. For example, some embodiments discussed below are described in the context of joining panels for assembly of an aircraft. However, the disclosed fastener is also suitable for use in any other application where work pieces need to be permanently joined—such as automotive, military vehicles, machinery, building construction, etc.

Many different types of fasteners for joining work pieces have been developed over the years. These include threaded fasteners which are removable, and permanent one-piece or two-piece metal fasteners requiring plastic deformation upon installation. However, all of these fasteners exhibit one or more undesirable characteristics—such as susceptibility to onset and propagation of corrosion, stress concentrations and fatigue, inconsistent clamp-up force, vulnerability to creep or loosening due to vibrations and shock experienced during service life, multiple production steps to ensure proper grain boundary control in the fastener metal, and multiple installation and post-processing steps such as machining and inspection.

However, the advent of amorphous metals has enabled the development of a fastener which overcomes the undesirable characteristics described above.

An amorphous metal is a solid metallic material, usually an alloy, with a disordered atomic-scale structure. Most ordinary metals and alloys are crystalline in their solid state, which means they have a highly ordered arrangement of atoms. Amorphous metals, however, are non-crystalline, and have a glass-like structure. But unlike common glasses, such as window glass, which are typically insulators, amorphous metals have good electrical conductivity, and other physical properties which make them useful in structural applications.

There are several ways in which amorphous metals can be produced, including extremely rapid cooling, physical vapor deposition, solid-state reaction, ion irradiation, and mechanical alloying. Amorphous metals are also known metallic glass or glassy metals. One example of an amorphous metal alloy includes: an alloy of 77.5% palladium, 6% copper, and 16.5% silicon; and an alloy of 41.2% zirconium, 13.8% titanium, 12.5% copper, 10% nickel, and 22.5% beryllium. Other examples of amorphous metal alloys include compositions containing varying percentages of the elements iron, molybdenum, nickel, chromium, phosphorus, carbon, boron and silicon. Still other amorphous metal alloy compositions include silver, aluminum, and other elements. The specific amorphous metal alloy used for the fastener disclosed below will depend on the properties needed for a particular application.

Amorphous metal alloys contain atoms of significantly different sizes, leading to low free volume (and therefore up to orders of magnitude higher viscosity than other metals and alloys) in molten state. The viscosity prevents the atoms moving enough to form an ordered lattice. The material structure also results in low shrinkage during cooling, and resistance to plastic deformation in the solid state. The absence of grain boundaries, the weak spots of crystalline materials, leads to better resistance to wear and corrosion. Amorphous metals, while technically glasses, are also much tougher and less brittle than oxide glasses and ceramics.

From a practical point of view, the amorphous structure of amorphous metals gives them two important properties. First, like other kinds of glasses, they experience a glass transition into a super-cooled semi-liquid state upon heating. In this thermoplastic state, the material has softened enough to allow dramatic re-shaping of a component before cooling. Second, the amorphous atomic structure means that amorphous metals do not have the crystalline defects called dislocations that govern many of the mechanical properties of more common alloys. One consequence of this is that amorphous metals can be much stronger (3-4 times or more) than their crystalline counterparts. Another consequence is that amorphous metals are less susceptible to onset and propagation of corrosion, stress concentrations and fatigue. These properties of amorphous metals can be exploited in a fastener design with a combination of features and characteristics previously unavailable, as detailed below.

Figure 1:
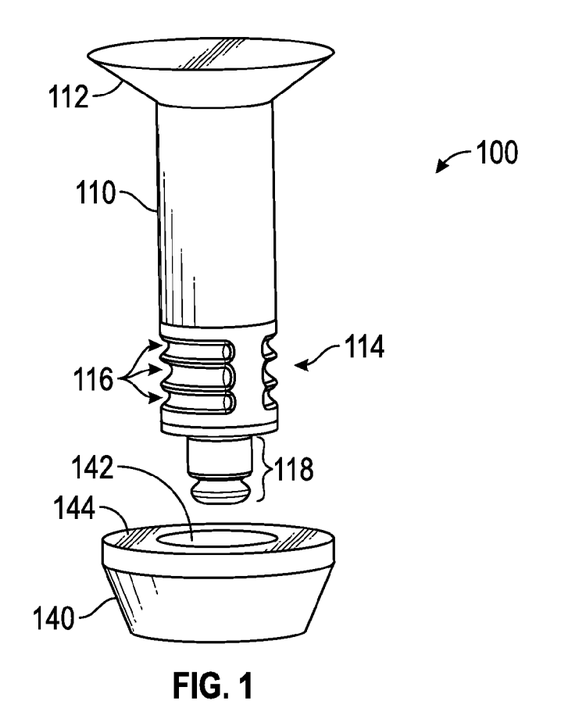
FIG. 1 is an illustration of an amorphous metal permanent fastener including a pin and a retaining collar, according to one embodiment of the invention.

FIG. 1 is an illustration of a permanent fastener 100 made of an amorphous metal, according to one embodiment of the present invention. The fastener 100 includes a fastener pin 110 and a retaining collar 140. The pin includes a head portion 112, which may have a traditional conical countersink shape, a counter-bore shape, or any other shape suitable for the intended application. Other shapes may include non-countersunk (raised) heads, and heads with an end-view shape which is not rotationally symmetrical (for example, oval or rectangular) in order to prevent fastener rotation. The pin 110 also includes a shank portion 114 with mechanical grip-inducing features that will be explained in detail below. In the fastener 100, the grip-inducing feature on the shank portion 114 is provided by circumferential locking grooves 116 which in this embodiment do not continue all the way around the circumference of the pin 110. The pin 110 further includes an optional pulling tip 118, also discussed below.

The retaining collar 140 has a tapered cylindrical shape, with a cylindrical hole 142 through its center. The hole 142 has a diameter just large enough to fit over the shank portion 114 of the pin 110. A wall 144 of the retaining collar 140 must have enough thickness to allow for substantial deformation during plastic forming without excessive thinning of material in the wall 144. Furthermore, the wall 144 must be thick enough to provide structural rigidity and gripping strength in the fastener 100 after installation. The taper on the exterior surface of the wall 144 allows for simultaneous application of radial compression and upward force on the collar 140 by a tool used during installation.

Figure 2:
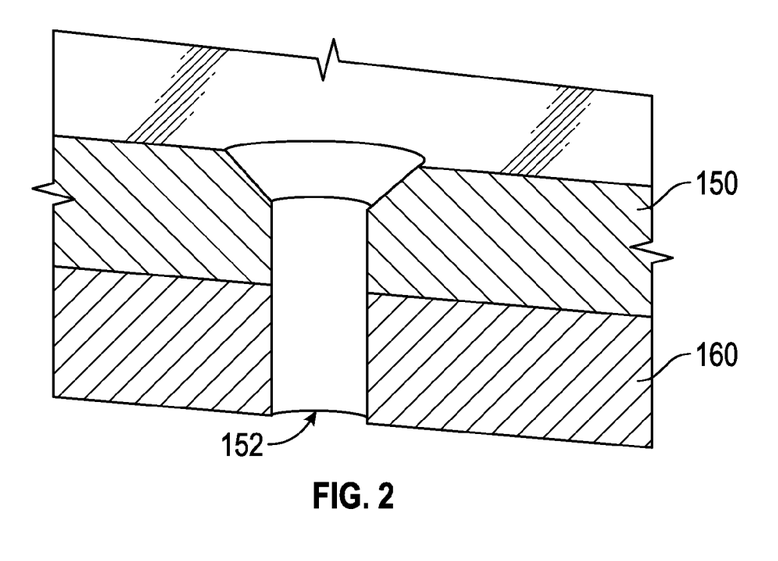
FIG. 2 is an illustration of two work pieces which have been brought together in preparation for installation of the fastener of FIG. 1.

FIG. 2 is an illustration of two work pieces 150 and 160 which have been brought together in preparation for installation of the fastener 100. The work pieces 150 and 160 include aligned holes 152 therethrough, where the holes 152 are just large enough in diameter to allow the pin 110 to be inserted. The work pieces 150 and 160 also include a countersink cone or other feature as needed to accommodate the head 112 of the pin 110. The work pieces 150 and 160 can be any sheet material which needs to be fastened together, including metal and composite materials. The fastener 100 is particularly well suited for use with work pieces 150/160 made of composite materials, which are widely used in the aircraft/aerospace industries and increasingly in other industries. In most applications, many of the fasteners 100 will be used to secure the work pieces 150/160 together. The fastener 100 is also suitable for securing work piece assemblies containing multiple (more than two) layers.

In the fastener 100, the retaining collar 140 must be comprised of an amorphous metal, as the collar 140 will be heated into the thermoplastic region of the material and then compression formed onto the shank 114. Amorphous metal provides the distinct advantage that the temperature required to reach the thermoplastic region of the material is far lower than softening temperatures for traditional metals. For example, one amorphous metal suitable for the retainer 140 reaches the thermoplastic region at around 200° C. The retaining collar 140 at 200° C. can be pressed against a work piece made of a composite material without melting or damaging the work piece. On the other hand, a retainer made from a traditional steel would have to be heated to a temperature of at least 800°-1000° C. in order to soften the retainer material, and at that temperature the composite material of the work piece would be destroyed on contact. Furthermore, if a traditional steel retainer were to be used without heating to the point of material softening, the forces required to plastically deform the retainer onto the pin of fastener would be so high that the work pieces would be mechanically damaged. These reasons provide the motivation for making the retaining collar 140 from an amorphous metal.

The pin 110 of the fastener 100 may also be comprised of an amorphous metal, or may be comprised of a traditional metal such as stainless steel. Amorphous metal provides several desirable features in the pin 110. One desirable feature of the pin 110 when made from amorphous metal is the ability to make the pin 110 smaller in diameter for a given amount of desired holding strength. This is due to the lack of grain structure in amorphous metals, which make the pin 110 less susceptible to stress concentrations and corrosion. Another desirable feature of the pin 110 when made from amorphous metal is that the pin 110 can be made in a casting process, or a process which is actually more similar to injection molding, rather than machining and/or heading as done for traditional metal fasteners. It is much simpler and less costly to create molds for a variety of different pin shapes than to set up machining and heading tools for the same variety of shapes. Furthermore, injection molding of the pin 110 results in a part without the high residual stresses produced by machining and heading operations on traditional metal fasteners.

Figure 3:
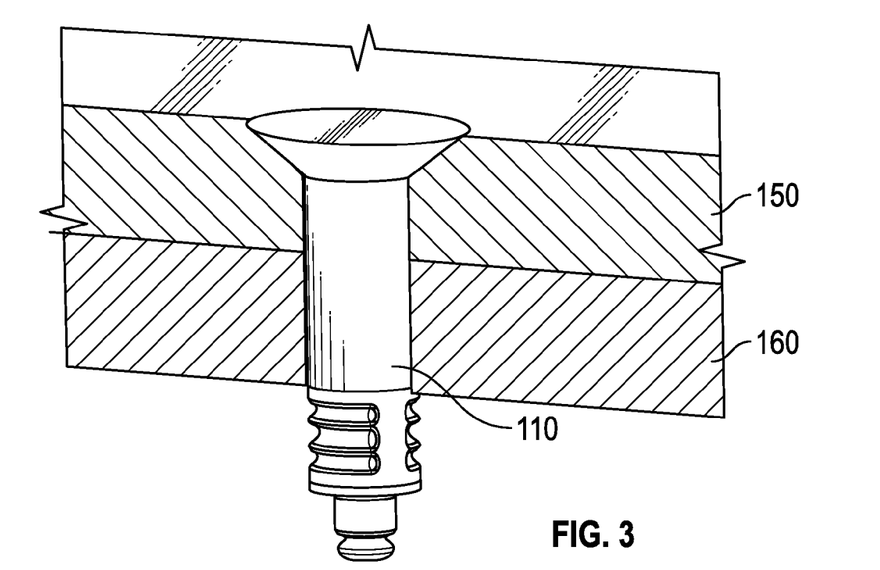
FIG. 3 is an illustration of the fastener of FIG. 1 in a first installation step, where the pin is inserted through the work pieces.
Figure 4:
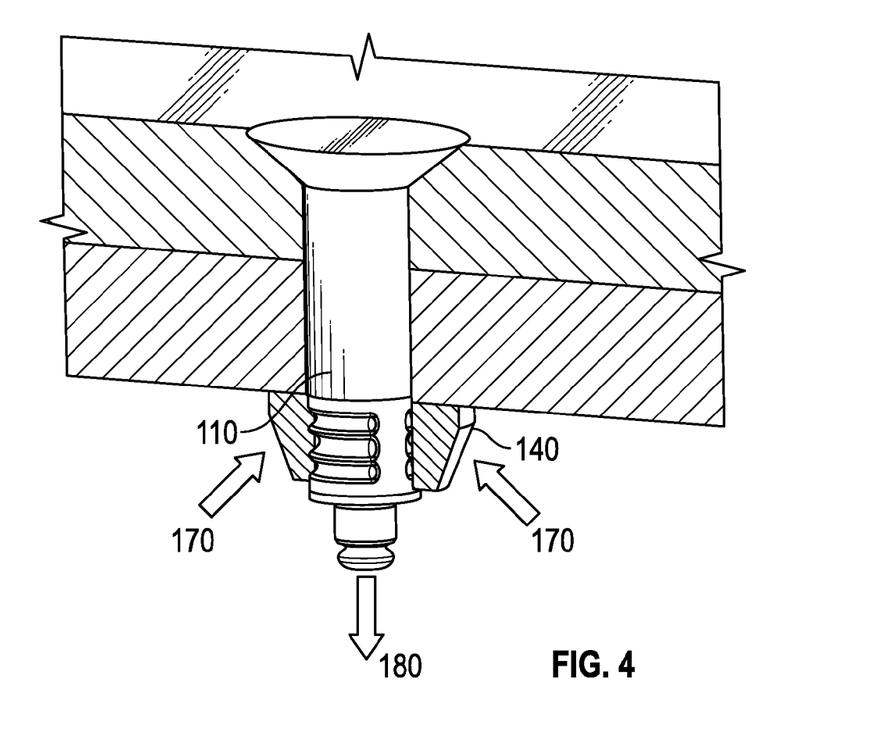
FIG. 4 is an illustration of the fastener of FIG. 1 in a second installation step, where the retaining collar—which has been heated into a thermoplastic material region—is positioned over a shank of the pin.

FIGS. 3-6 show the fastener 100 in four different stages of installation in the work pieces 150/160. FIG. 3 is an illustration of the amorphous metal fastener 100 in a first installation step, where the pin 110 is inserted through the holes in the work pieces 150/160. FIG. 4 is an illustration of the fastener 100 in a second installation step, where the retaining collar 140 is positioned over the shank portion 114 of the pin 110. At this step, the collar 140 must be heated into the thermoplastic material region where it can be plastically deformed under fairly low stress. The collar 140 can be directly heated by the tool which is used to compress the collar 140 onto the pin 110. For example, the tool could include an inductive heating element for heating the collar 140. Alternately, the collar 140 can be preheated in a separate oven or other heating apparatus, and transferred to the tool for forming onto the pin 110. Care must be taken to heat the collar 140 to a working temperature in the thermoplastic region, but not to a temperature which would cause it to melt.

At the step shown in FIG. 4, the heated collar 140 is pressed upward and compressed radially inward, as shown by arrows 170. Simultaneously, the pulling tip 118 is used to pull downward (arrow 180) on the pin 110, which both resists the upward push of the collar 140 and provides a clamping pre-load in the work pieces 150/160. Due to the compressive force it is experiencing and the thermoplastic material properties it possesses, the cylindrical wall 144 of the collar 140 is radically compressed into the locking grooves 116 to affix the collar 140 on the pin 110. At that point, the collar 140 must be rapidly cooled back to its solid amorphous metal state. Care must be taken not to allow the collar 140 to cool too slowly, which would allow crystalline structure to form. A cooling gas or liquid could be applied to the collar 140 if necessary to achieve the desired rate of cooling.

Figure 5:
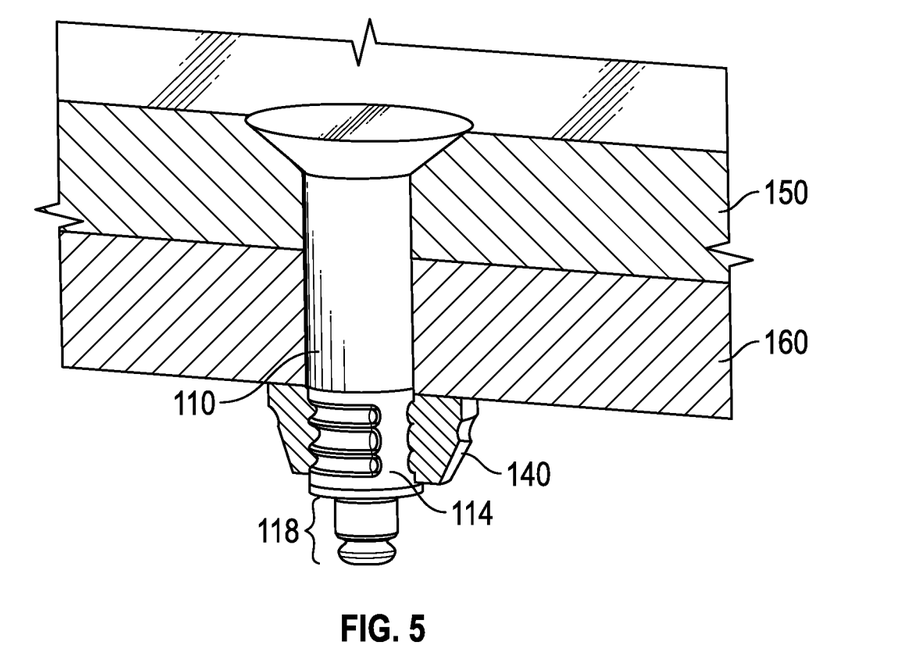
FIG. 5 is an illustration of the fastener of FIG. 1 in a third installation step, where the retaining collar has been thermoplastically formed via compression onto the shank of the pin.

FIG. 5 is an illustration of the fastener 100 in a third installation step, where the retaining collar 140 has been thermoplastically formed via compression onto the shank 114 of the pin 110. It can be seen in FIG. 5 that the inside diameter of the collar 140 has deformed into the grooves 116 on the pin 110. This dramatic deformation of the collar 140 provides tremendous mechanical grip in the fastener 100 when installed. It can also be seen that the outside diameter of the collar 140 has deformed to take the shape of the tool that was used to compress the collar 140 in the previous step. The shape of the tool and the outside of the collar 140 is not significant, other than that the tool shape used to most effectively compress the collar 140 may be dependent upon the design of the mechanical grip features on the shank 114 of the pin 110.

Figure 6:
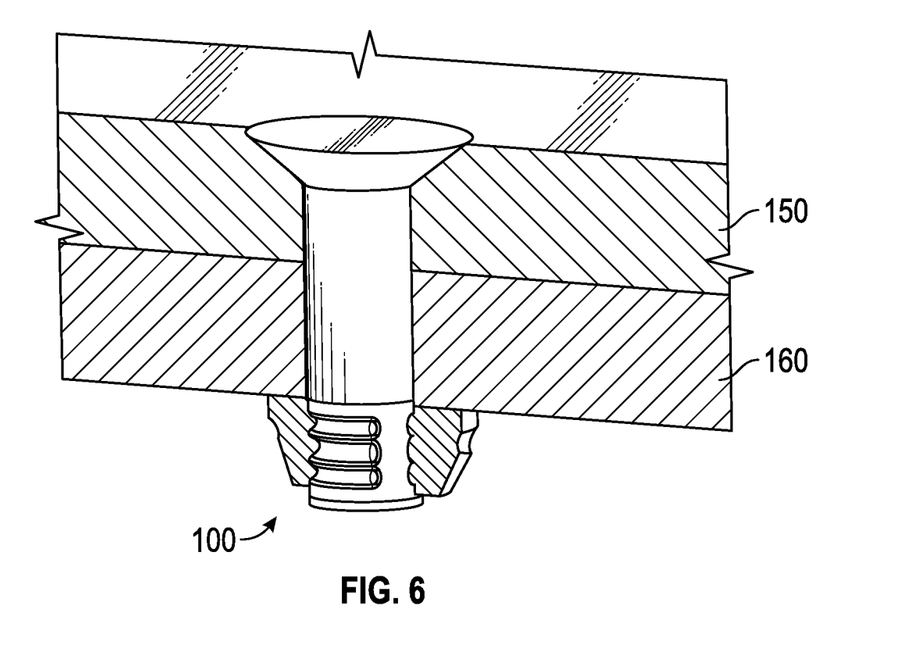
FIG. 6 is an illustration of the fastener of FIG. 1 in a final installation step, where the collar has cooled and a pulling tip has been removed from the pin.

FIG. 6 is an illustration of the fastener 100 in a final installation step, where the collar has fully cooled and the pulling tip 118 has been removed from the pin 110. The pulling tip 118 may be designed with a stress riser undercut at its base, which would allow the pulling tip 118 to be snapped or broken off of the pin 110 by applying a lateral force and/or bending moment. As shown in FIG. 6, the fastener 100 installation is complete, including a residual tension in the pin 110 and a clamping pre-load in the work pieces 150/160.

Figure 7:
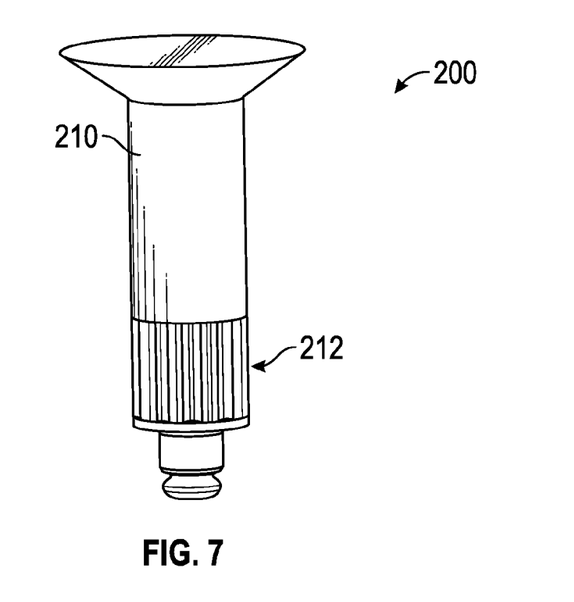
FIG. 7 is an illustration of a second embodiment of an amorphous metal permanent fastener, where the shank of the pin has a knurled shape.

FIG. 7 is an illustration of a pin 210 for a fastener 200, which is a second embodiment of an amorphous metal permanent fastener. On the pin 210, a shank 212 includes a grip feature which has a knurled shape. The knurled shape of the shank 212 would be extremely effective in preventing rotation of the retaining collar 140 relative to the pin 210.

Figure 8:
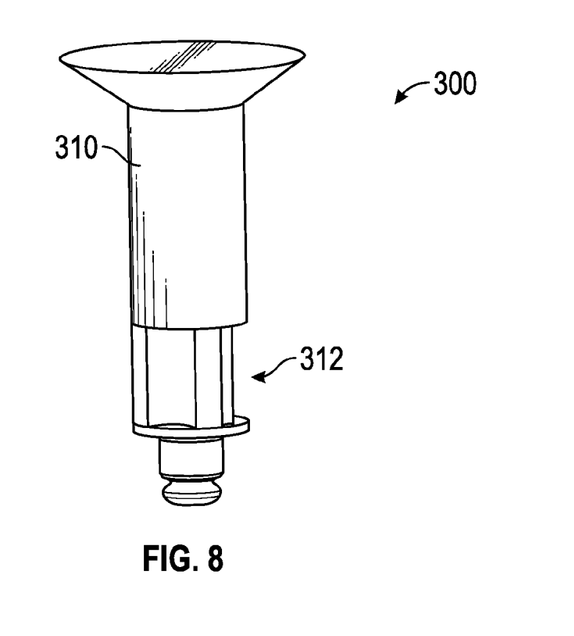
FIG. 8 is an illustration of a third embodiment of an amorphous metal permanent fastener, where the shank of the pin has a fluted shape.

FIG. 8 is an illustration of a pin 310 for a fastener 300, which is a third embodiment of an amorphous metal permanent fastener. On the pin 310, a shank 312 includes a grip feature which has a fluted or scalloped shape formed by a plurality of axial grooves on the pin 310. The axial grooves would not extend all the way to the end of the shank 312; a full-diameter shoulder would need to be provided in order to prevent the collar 140 from pulling off of the end of the pin 310. The shape of the shank 312 would be very effective in preventing rotation of the retaining collar 140 relative to the pin 310, and also provide very positive axial grip of the collar 140 on the pin 310.

The number and type of mechanical grip features and shapes which can be used on the pin shank of the disclosed amorphous metal fastener are virtually limitless. The pin shank designs can include rotationally symmetrical shapes, and non-rotationally symmetrical shapes which prevent rotation of the retaining collar 140 relative to the pin. The pin shank shapes are enabled by the large-scale deformations of the retaining collar 140 which are made possible through the use of amorphous metal alloys.

Figure 9:
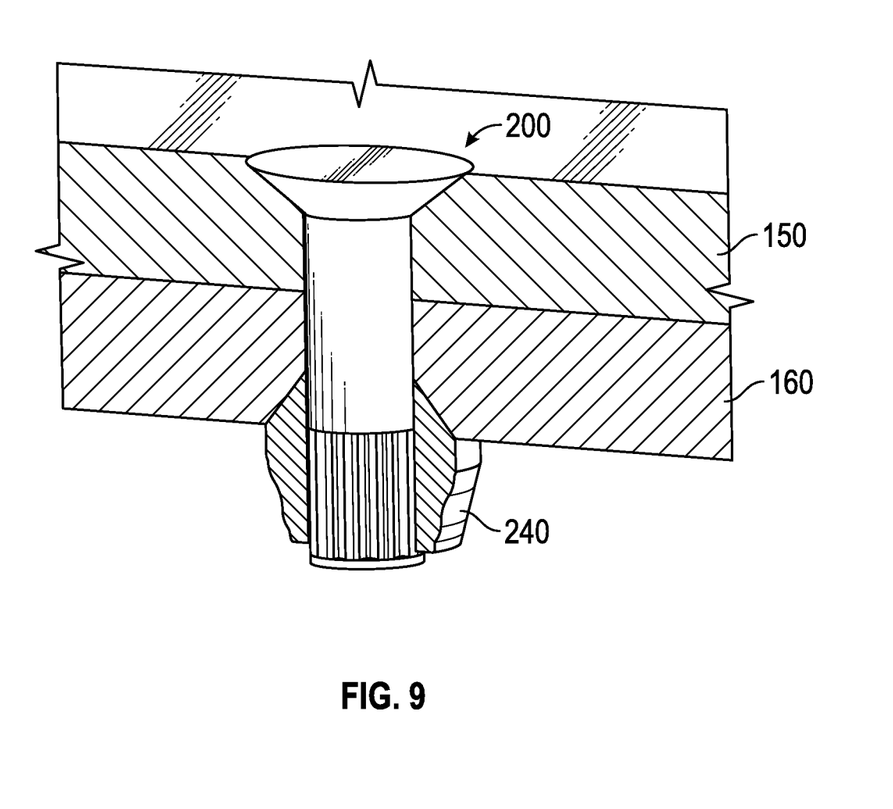
FIG. 9 is an illustration of the amorphous metal permanent fastener of FIG. 7, after installation, where the retaining collar has been thermoplastically formed onto the shank of the pin and into a countersink cone on the lower work piece.

FIG. 9 is an illustration of the amorphous metal permanent fastener 200 of FIG. 7, after installation, where a retaining collar 240 is used which has a different shape than the retaining collar 140. The retaining collar 240 has a conical shape designed to fit into a countersink cone on the bottom surface of the work piece 160. The countersink cone on the bottom surface of the work piece 160 may be provided in order to improve fastener performance through increased contact surface area, or the countersink cone on the bottom surface of the work piece 160 may simply be a shape which was used with a legacy fastener of some sort. In either case, the retaining collar 240 can be shaped to generally fit the countersink cone, and further formed into the countersink cone via plastic deformation during installation.

Figure 10:
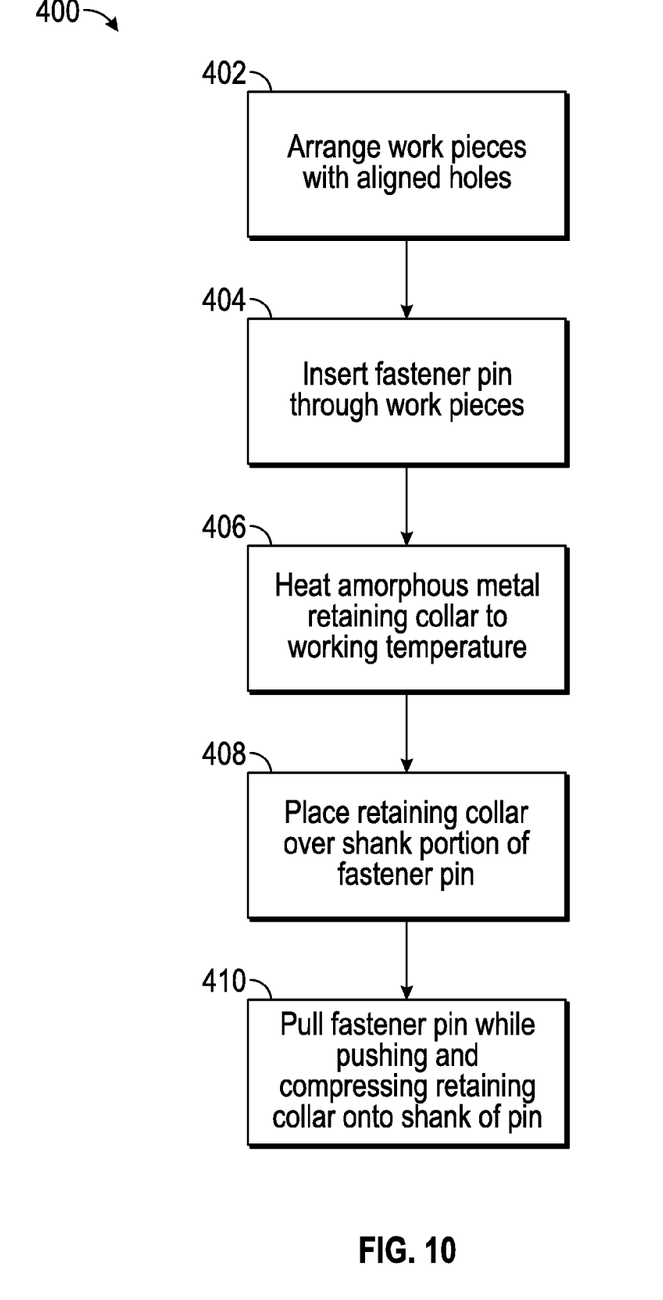
FIG. 10 is a flowchart diagram of a method for joining work pieces using an amorphous metal fastener.

FIG. 10 is a flowchart diagram 400 of a method for joining work pieces using an amorphous metal fastener. At box 402, the work pieces 150/160 are arranged in a position as they are to be joined, with holes aligned. At box 404, the fastener pin 110 is inserted through the work pieces 150/160, so that the head 112 of the pin 110 contacts the outside surface of the work piece 150 and the shank portion 114 of the pin 110 extends clear of the work piece 160.

At box 406, the amorphous metal retaining collar 140 is heated to a working temperature which causes the retaining collar 140 to have thermoplastic material properties. The heating can be performed within the installation tool, or separately in an oven or other heating unit. At box 408, the retaining collar 140 is placed over the shank portion 114 of the fastener pin 110, such that the retaining collar 140 surrounds the locking geometric features (grooves 116) on the shank portion 114 of the pin 110. At box 410, the fastener pin 110 is pulled while simultaneously applying a force to the conical outer wall of the retaining collar 140 which counteracts the pulling of the fastener pin 110 and also compresses the retaining collar 140 onto the locking grooves 116 on the shank portion 114 of the pin 110. As discussed above, the collar 140 is then cooled rapidly enough to preserve its amorphous metal properties. The pulling tip 118 can also be removed from the fastener pin 110.

The amorphous metal fastener described above provides numerous advantages to any manufacturer needing to secure together two or more composite panels. These advantages include the ability to make the fastener smaller due to the desirable material properties of the amorphous metal, particularly the absence of a crystalline grain structure resulting in improved resistance to corrosion and stress concentrations. In addition, the amorphous metal retaining collar, which can be heated to a thermoplastic region of the material without risk of damaging the composite work piece, can be dramatically deformed onto the shank of the pin upon installation. The dramatic plastic deformation of the collar provides excellent mechanical grip of the fastener, further improving performance for a given size. Finally, the amorphous metal fastener can be injection molded in a number of different sizes and shapes with a minimum of tooling investment compared to traditional machined and headed metal fasteners.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fastener for joining work pieces, said fastener comprising:
    a pin including a head portion which bears against an outside face of a first work piece, and a shank portion which passes through apertures in the work pieces, where the shank portion includes locking geometric features on an outer surface thereof; and
    a retaining collar composed of an amorphous metal alloy which transitions to a thermoplastic material region at a temperature of less than 220° C., where the work pieces are undamaged by contact with the retaining collar at 220° C., said collar including a cylindrical inner wall, where the collar is adapted to be heated into a thermoplastic material region, disposed about the shank portion of the pin, pressed against an outside face of a second work piece while the pin is pulled to apply compression to the work pieces, and radially compressed such that the cylindrical inner wall plastically deforms to engage with the locking geometric features on the shank portion of the pin.

2. The fastener of claim 1 wherein the locking geometric features do not have continuous rotational symmetry around the outer surface, thereby preventing rotation of the retaining collar on the pin after the retaining collar has been formed onto the pin.

3. The fastener of claim 2 wherein the locking geometric features are a plurality of interrupted circumferential grooves.

4. The fastener of claim 2 wherein the locking geometric features are a plurality of axial grooves which do not extend to an end of the shank portion of the pin.

5. The fastener of claim 1 wherein the retaining collar has an outer wall with a conical shape which enables an installation tool to simultaneously apply an axial force to press the collar against the second work piece and a radial compression to plastically deform the collar onto the shank portion of the pin.

6. The fastener of claim 1 wherein the pin also includes a pulling tip at an end of the pin opposite the head portion, where the pulling tip is used to pull the pin while the retaining collar is being installed.

7. The fastener of claim 6 wherein the pulling tip includes a circumferential undercut groove at its base which enables the pulling tip to be purposely broken off of the pin after the retaining collar has been installed.

8. The fastener of claim 1 wherein the work pieces are composed of composite materials.

9. The fastener of claim 1 wherein the pin is also composed of an amorphous metal alloy.

10. The fastener of claim 1 wherein the head portion of the pin has a non-rotationally symmetric shape which fits into a compatible counter-sink hole in the outside face of the first work piece, thereby preventing rotation of the pin relative to the work pieces.

11. A fastener for joining composite material work pieces, said fastener comprising:
    a pin including a head portion which bears against an outside face of a first work piece, a shank portion which passes through apertures in the work pieces, where the shank portion includes non-rotationally symmetric locking geometric features on an outer surface thereof, and a pulling tip at an end opposite the head portion; and
    a retaining collar composed of an amorphous metal alloy which transitions to a thermoplastic material region at a temperature of less than 220° C., where the composite work pieces are undamaged by contact with the retaining collar at 220° C., said collar including a cylindrical inner wall, where the collar is adapted to be heated into a thermoplastic material region, disposed about the shank portion of the pin, pressed against an outside face of a second work piece while the pulling tip of the pin is pulled to apply compression to the work pieces, and radially compressed such that the cylindrical inner wall plastically deforms to engage with the locking geometric features on the shank portion of the pin.

12. The fastener of claim 11 wherein the retaining collar has an outer wall with a conical shape which enables an installation tool to simultaneously apply an axial force to press the collar against the second work piece and a radial compression to plastically deform the collar onto the shank portion of the pin.

13. The fastener of claim 11 wherein the head portion of the pin has a non-rotationally symmetric shape which fits into a compatible counter-sink hole in the outside face of the first work piece, thereby preventing rotation of the pin relative to the work pieces.

14. A method for joining work pieces with an amorphous metal fastener, said method comprising:
    arranging the work pieces in a position to be joined, with holes in the work pieces aligned to receive the fastener;
    inserting a fastener pin through the holes in the work pieces until a head portion of the fastener pin bears against an outside surface of a first work piece, where a shank portion of the fastener pin extends beyond an outside surface of a second work piece, and the shank portion includes locking geometric features on an outer surface thereof;
    heating an amorphous metal retaining collar to a working temperature, where the working temperature causes the retaining collar to have thermoplastic material properties;
    placing the retaining collar over the shank portion of the fastener pin, where the retaining collar has a cylindrical inner wall which surrounds the locking geometric features on the shank portion of the pin, and a conical outer wall; and
    pulling the fastener pin while simultaneously applying a force to the conical outer wall of the retaining collar which counteracts the pulling of the fastener pin and also compresses the retaining collar onto the locking geometric features on the shank portion of the fastener pin; wherein the work pieces are composed of composite materials, and the working temperature is less than 220° C., where the retaining collar when heated and pressed against the second work piece does not damage the composite materials.

15. The method of claim 14 further comprising cooling the retaining collar at a rate sufficient to preserve amorphous metal material properties in the retaining collar.

16. The method of claim 14 wherein the head portion of the fastener pin has a non-rotationally symmetric shape which fits into a compatible counter-sink hole in the outside surface of the first work piece, thereby preventing rotation of the pin relative to the work pieces, and the locking geometric features on the outer surface of the shank portion of the fastener pin are non-rotationally symmetric, thereby preventing rotation of the retaining collar on the fastener pin after the retaining collar has been compressed onto the pin.

17. The method of claim 14 wherein a tool which is used to compress the retaining collar onto the shank portion of the fastener pin includes a heating element, and the tool is also used to heat the retaining collar to the working temperature.

* * * * *